April 6, 1926.
H. CAVE
DUSTPAN
Filed Jan. 6, 1923
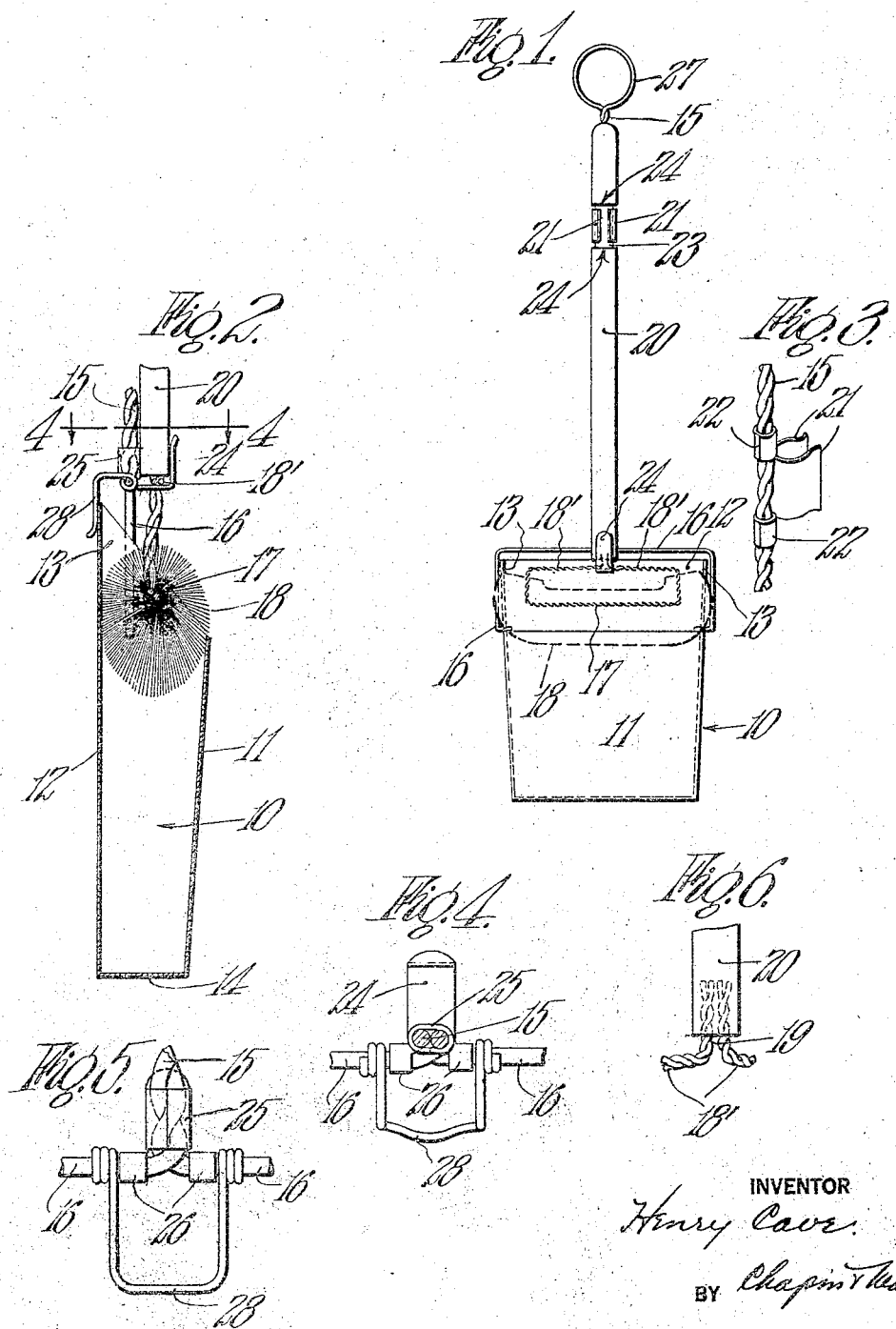
INVENTOR
Henry Cave.
BY Chapin & Neal
ATTORNEYS Patented Apr. 6, 1926.

1,579,279

UNITED STATES PATENT OFFICE.

HENRY CAVE, OF SPRINGFIELD, MASSACHUSETTS.

DUSTPAN.

Application filed January 6, 1923. Serial No. 611,121.

*To all whom it may concern:*

Be it known that I, HENRY CAVE, citizen of the United States, residing at Springfield, in the county of Hampden and State of Massachusetts, have invented new and useful Improvements in Dustpans, of which the following is a specification.

This invention relates to improvements in dust pans of the type which are provided with a receptacle to contain the sweepings.

Dust pans of this type generally comprise an open mouthed receptacle of generally rectangular shape having one wall projecting beyond the opposing wall at the mouth of the receptacle, such projecting portion serving as the dust pan proper. This sort of dust pan usually has a handle pivotally connected to the receptacle by a bail portion and sometimes the pan is provided with a closure for the open mouth thereof.

This invention has for its object to provide in connection with a dust pan of the general type described means for releasably supporting a brush,—an article which of necessity is always needed at the same time as the pan,—and furthermore in so supporting the brush that it functions as a closure for the open mouth of the dust receptacle.

Other objects and advantages will appear in the following description and in the illustrative embodiment of the invention in the accompanying drawings, in which:—

Fig. 1 is a front elevational view of a device embodying the invention;

Fig. 2 is an enlarged sectional elevational view thereof;

Fig. 3 is a detail perspective view showing one member of the brush supporting means;

Fig. 4 is an enlarged fragmentary sectional plan view taken on the line 4—4 of Fig. 2;

Fig. 5 is a rear elevational view of the parts shown in Fig. 4; and

Fig. 6 is a fragmentary view showing a detail of the brush structure.

Referring to these drawings; the dust receptacle is indicated generally by reference numeral 10 and preferably consists of a rectangular structure having front and rear walls 11 and 12, respectively, with connecting side walls 13 and a bottom wall 14,—the whole forming a receptacle open at its upper end. The rear wall 12 extends upwardly above the front wall 11 and this projecting portion constitutes the effective dust pan proper. The upper edge of each side wall is inclined and connects the upper edges of the front and rear walls, thereby forming sides for the dust pan proper. The receptacle 10 is provided with a suitable handle 15 which is pivotally connected to the side walls 13 of the receptacle by a forked or bail portion 16. As shown, the handle 15 is made of two twisted wires and these two wires are separated and bent as indicated to form the two arms of the fork or bail portion.

For use with the dust pan described, a brush is provided which may be of any suitable type which will cooperate with the open mouth of receptacle 10 to form a closure therefor. As an example of one suitable type, at present preferred, a brush of the type wherein the bristles are held in place between two twisted wires, which form the core, is shown. In the drawings, the twisted wire core is designated 17 and the bristles 18. The core 17 is of generally broad U-form and the bristles preferably extend not only across the base of the U but also somewhat along the upright sides thereof,—the outline of the brush being shown by dotted lines in Fig. 1. The ends of the U shaped core are bent inwardly toward one another, as at 18' until they meet and are then bent upwardly in parallel relation (Fig. 6) to form a tang portion 19 for insertion in a socket provided in the base of a handle 20, which may be an ordinary round wooden handle similar to a broom handle. By preference, the core 17 is disposed eccentrically of the bristles, as viewed in cross section in Fig. 2. The brush, whatever its type or construction is such as to close the open mouth of receptacle 10 and a brush, having rounded ends as shown, is desirable because such ends may be slightly compressed against the side walls 13 even as the front and back of the brush are compressed against the front and rear walls 11 and 12, respectively, to form a tight closure for the receptacle.

For supporting the brush in closure forming relation with the receptacle, I have shown a pair of spring jaws 21, suitably fastened to handle 15, as by integral clips 22, near its upper end. These jaws are designed to engage with the handle 20 and releasably hold it in substantially parallel relation with the handle 15. By preference handle 20 is provided with a circumferential groove 23 in which the jaws 21 engage, whereby upper and lower shoulders 24 are provided to limit the axial movement of the handle while held by the jaws. For supporting the weight of the brush and handle and also for limiting its downward movement, I provide a bracket 24, of right angular shape, which is suitably attached to handle 15, as by an integral clip 25 which encompasses the handle 15 near its junction with the bail portion and also, if desired, by two clips 26 which are bent around the separate wires of the bail portion. The clips 25 and 26, as well as the clips 22, may be soldered to the wires, if desired. The bracket 24 has a horizontal arm which underlies the lower end of handle 20 and a vertical arm which extends upwardly a short distance to engage the periphery or side of the handle. The bracket 24 and the jaws 21 not only releasably hold the brush in position but define the location of the brush with relation to the receptacle for the closure function.

The handle 15 may have an eye 27, or other suitable means, whereby it may be hung from a hook. The receptacle oftentimes is left in a corner of a room where no hook is available or perhaps not desired. In such cases the receptacle tends to tip back and the two parts,—the receptacle and handle,—move like the blades of a jack-knife causing a collapsing of these parts. To prevent this action, I provide a catch 28 pivoted to bail 16 and adapted to engage the upper central portion of the rear wall 12 of receptacle 10. This catch may be conveniently formed of wire bent up in U-form and having its ends wrapped around the wires 16 as clearly shown in Figs. 4 and 5.

The invention provides for the two elements,—the brush and pan,—being always together when needed and moreover releasably connected together into a unit outfit which is not only of neat appearance but is conveniently portable and can be stood on end in a corner, when desired, without the handle falling upon the floor, which action is usually followed by an overturning of the receptacle and the spilling of its contents. Naturally with a dust pan of this type a closure is desired and my invention is characterized by supporting the brush from and in closure forming relation with the receptacle.

The invention has been disclosed herein in an embodiment at present preferred, for illustrative purposes but the scope of the invention is defined by the appended claims rather than by the foregoing description.

Claims:

1. In a device of the class described, an open mouthed receptacle, a handle therefor, a brush designed to fit in and close the open mouth of the receptacle, a handle for the brush, spring jaw means on one of said handles for detachably engaging the other handle, and shoulders provided on the latter for cooperation with the last named means for limiting the relative endwise play of the handles and positioning the brush in closure forming relation with the receptacle.

2. In a device of the class described, an open mouthed receptacle, a handle therefor, a brush designed to fit in and close the open mouth of the receptacle, a handle for the brush, a bracket on the first handle to underlie the second handle and position the latter so that the brush lies in closure forming relation with the receptacle, and means for detachably connecting the handles together.

3. In a device of the class described, an open mouthed receptacle, a handle therefor, a brush designed to fit in and close the open mouth of the receptacle, a handle for the brush, means on the first handle cooperating therewith to form an open ended socket for reception of the lower end of the brush handle and position the latter so that the brush lies in closure forming relation with the receptacle, and means for detachably connecting the handles together.

In testimony whereof I have affixed my signature.

HENRY CAVE.